US012769429B2

(12) United States Patent
Hsu et al.

(10) Patent No.: US 12,769,429 B2
(45) **Date of Patent: *Oct. 20, 2026**

(54) TOUCH PAD AND SENSING MODULE THEREOF

(71) Applicant: PIXART IMAGING INC., Hsin-Chu (TW)

(72) Inventors: Che-Chia Hsu, Hsin-Chu (TW); Hui-Chen Hsu, Hsin-Chu (TW); Yu-Han Chen, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/310,944

(22) Filed: Aug. 27, 2025

(65) Prior Publication Data

US 2026/0072554 A1 Mar. 12, 2026

Related U.S. Application Data

(63) Continuation of application No. 18/826,316, filed on Sep. 6, 2024, now Pat. No. 12,422,965.

(51) Int. Cl.

| | |
|---|---|
| ***G06F 3/044*** | (2006.01) |
| ***H01Q 1/22*** | (2006.01) |
| ***H01Q 1/52*** | (2006.01) |

(52) U.S. Cl.

CPC .......... *G06F 3/0446* (2019.05); *G06F 3/0445* (2019.05); *H01Q 1/22* (2013.01); *H01Q 1/526* (2013.01); *G06F 2203/04107* (2013.01)

(58) Field of Classification Search

CPC ................. G06F 3/0446; G06F 3/0445; G06F 2203/04107; H01Q 1/22; H01Q 1/526

See application file for complete search history.

(56) References Cited

U.S. PATENT DOCUMENTS

| | | | | | |
|---|---|---|---|---|---|
| 2002/0139993 | A1* | 10/2002 | Aoki | H01Q 1/526 | 343/846 |
| 2013/0093696 | A1* | 4/2013 | Huang | G06F 3/0445 | 345/173 |
| 2015/0015806 | A1* | 1/2015 | Wu | G06F 3/0446 | 349/12 |
| 2015/0309605 | A1* | 10/2015 | Hsu | G06F 3/0443 | 345/173 |

(Continued)

*Primary Examiner* — Md Saiful A Siddiqui

(74) *Attorney, Agent, or Firm* — Li & Cai Intellectual Property Office

(57) ABSTRACT

A touch pad and a sensing module thereof are provided. The sensing module defines an annular signal channel along a thickness direction. The sensing module includes a grounding layer and an electrode layer located at one side of the grounding layer. The electrode layer includes a plurality of first electrodes, a plurality of second electrodes, and a plurality of metal pads that are spaced apart from the first electrodes and the second electrodes. The first electrodes are arranged in rows parallel to each other, the second electrodes are arranged in columns parallel to each other, and at least one of the rows and at least one of the columns are arranged across the annular signal channel that is provided without any metal pad therein. A projection space defined by orthogonally projecting the grounding layer along the thickness direction is overlapped with the first electrodes and the second electrodes.

20 Claims, 13 Drawing Sheets

(56) References Cited

U.S. PATENT DOCUMENTS

| | | | | |
|---|---|---|---|---|
| 2017/0038878 | A1* | 2/2017 | Lin | G06F 3/0443 |
| 2018/0018051 | A1* | 1/2018 | Ogura | G02F 1/1343 |
| 2022/0155893 | A1* | 5/2022 | Bertrand | G06F 3/0445 |

* cited by examiner

TOUCH PAD AND SENSING MODULE THEREOF

CROSS-REFERENCE TO RELATED PATENT APPLICATION

This application is a continuation of the U.S. patent application Ser. No. 18/826,316 filed on Sep. 6, 2024 and entitled "TOUCH PAD AND SENSING MODULE THEREOF". The entirety of the above-mentioned patent application is hereby incorporated by reference herein and made as a part of this specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a touch panel, and more particularly to a touch panel and a sensing module thereof for allowing a signal to pass therethrough.

BACKGROUND OF THE DISCLOSURE

When components (e.g., a driving electrode layer, a sensing electrode layer, or a grounding layer) of a conventional touch pad are designed to have a cooperative layout, only an improvement of sensing accuracy is considered, while proper matching of a near-field communication (NFC) antenna tends to not be considered.

SUMMARY OF THE DISCLOSURE

In response to the above-referenced technical inadequacy, the present disclosure provides a touch panel and a sensing module thereof for effectively improving on the issues associated with conventional touch panels.

In order to solve the above-mentioned problems, one of the technical aspects adopted by the present disclosure is to provide a touchpad for allowing a signal to pass therethrough and defining an annular signal channel along a thickness direction thereof. The touchpad includes a grounding layer, a circuit layer, a first electrode layer, and a second electrode layer. The grounding layer defines a first side and a second side that is opposite to the first side along the thickness direction. The circuit layer is arranged at the first side of the grounding layer along the thickness direction and includes a near-field communication (NFC) antenna arranged in the annular signal channel. The first electrode layer is arranged at the second side of the grounding layer along the thickness direction, and includes a plurality of first electrodes and a plurality of first metal pads. The first electrodes are arranged in a plurality of rows parallel to each other, and the first electrodes of at least one of the rows are arranged across the annular signal channel. The first metal pads are spaced apart from the first electrodes, and the annular signal channel is provided without any one of the first metal pads therein. The second electrode layer is arranged at the second side of the grounding layer along the thickness direction, and includes a plurality of second electrodes and a plurality of second metal pads. The second electrodes are arranged in a plurality of columns parallel to each other, and the second electrodes of at least one of the columns are arranged across the annular signal channel. The second metal pads are spaced apart from the second electrodes, and the annular signal channel is provided without any one of the second metal pads therein. Moreover, a projection space defined by orthogonally projecting the grounding layer along the thickness direction is overlapped with the first electrodes and the second electrodes.

In one of the possible or preferred embodiments, the grounding layer includes a connection segment and a plurality of shielding segments parallel to each other and each having an elongated shape. Each of the shielding segments has a connection end and a free end that is opposite to the connection end. The connection ends of the shielding segments are connected to the connection segment, and the free ends of the shielding segments are spaced apart from the connection segment.

In one of the possible or preferred embodiments, each of the rows is parallel to a first direction perpendicular to the thickness direction, and each of the columns is parallel to a second direction perpendicular to the thickness direction. The connection segment has a ring shape, the shielding segments are arranged in an area surrounded by the connection segment, and each of the shielding segments is parallel to the first direction.

In one of the possible or preferred embodiments, the first direction is perpendicular to the second direction, the first electrodes of each of the rows are connected along the first direction, and the second electrodes of each of the columns are electrically coupled to each other.

In one of the possible or preferred embodiments, any two of the shielding segments adjacent to each other jointly define a plurality of layout areas therebetween, and a plurality of first projection regions respectively defined by orthogonally projecting the first metal pads onto the grounding layer along the thickness direction are each located in one of the layout areas.

In one of the possible or preferred embodiments, a plurality of second projection regions respectively defined by orthogonally projecting the second metal pads onto the grounding layer along the thickness direction are each located in one of the layout areas.

In one of the possible or preferred embodiments, at least one of the first projection regions is overlapped with one of the second projection regions.

In one of the possible or preferred embodiments, the circuit layer includes a shielding mesh surrounding an outer side of the annular signal channel, and an outer contour of the shielding mesh is a non-closed loop.

In one of the possible or preferred embodiments, the touchpad further includes a plurality of conductive pillars each arranged along the thickness direction. Two ends of each of the conductive pillars are respectively connected to the grounding layer and the shielding mesh.

In one of the possible or preferred embodiments, a projection region defined by orthogonally projecting the first electrodes onto the second electrode layer is substantially complementary in shape to the second electrodes.

In order to solve the above-mentioned problems, another one of the technical aspects adopted by the present disclosure is to provide a sensing module of a touchpad for allowing a signal to pass therethrough and defining an annular signal channel along a thickness direction thereof. The sensing module includes a grounding layer, a first electrode layer, and a second electrode layer. The grounding layer defines a first side and a second side that is opposite to the first side along the thickness direction. The grounding layer includes a connection segment and a plurality of shielding segments parallel to each other and each having an elongated shape. Each of the shielding segments has a connection end and a free end that is opposite to the connection end. The connection ends of the shielding segments are connected to the connection segment, and the free ends of the shielding segments are spaced apart from the connection segment. The first electrode layer is arranged at the second side of the grounding layer along the thickness direction and includes a plurality of first electrodes arranged in a plurality of rows parallel to each other. Each of the rows is parallel to a first direction perpendicular to the thickness direction, and the first electrodes of at least one of the rows are arranged across the annular signal channel. The second electrode layer is arranged at the second side of the grounding layer along the thickness direction and includes a plurality of second electrodes arranged in a plurality of columns parallel to each other. Each of the columns is parallel to a second direction perpendicular to the thickness direction, and the second electrodes of at least one of the columns are arranged across the annular signal channel. Moreover, a projection space defined by orthogonally projecting the grounding layer along the thickness direction is overlapped with the first electrodes and the second electrodes.

In one of the possible or preferred embodiments, each of the rows is parallel to a first direction perpendicular to the thickness direction, and each of the columns is parallel to a second direction perpendicular to the thickness direction. The connection segment has a ring shape, the shielding segments are arranged in an area surrounded by the connection segment, and each of the shielding segments is parallel to the first direction.

In one of the possible or preferred embodiments, the first electrode layer includes a plurality of first metal pads spaced apart from the first electrodes. The annular signal channel is provided without any one of the first metal pads therein. The second electrode layer includes a plurality of second metal pads spaced apart from the second electrodes. The annular signal channel is provided without any one of the second metal pads therein.

In one of the possible or preferred embodiments, any two of the shielding segments adjacent to each other jointly define a plurality of layout areas therebetween, and a plurality of first projection regions respectively defined by orthogonally projecting the first metal pads onto the grounding layer along the thickness direction are each located in one of the layout areas.

In one of the possible or preferred embodiments, a plurality of second projection regions respectively defined by orthogonally projecting the second metal pads onto the grounding layer along the thickness direction are each located in one of the layout areas.

In one of the possible or preferred embodiments, at least one of the first projection regions is overlapped with one of the second projection regions.

In order to solve the above-mentioned problems, yet another one of the technical aspects adopted by the present disclosure is to provide a sensing module of a touchpad for allowing a signal to pass therethrough and defining an annular signal channel along a thickness direction thereof. The sensing module includes a grounding layer and an electrode layer. The grounding layer defines a first side and a second side that is opposite to the first side along the thickness direction. The electrode layer is arranged at the second side of the grounding layer along the thickness direction and includes a plurality of first electrodes, a plurality of second electrodes, and a plurality of metal pads. The first electrodes are arranged in a plurality of rows parallel to each other. The first electrodes of at least one of the rows are arranged across the annular signal channel. The second electrodes are arranged in a plurality of columns parallel to each other. The second electrodes of at least one of the columns are arranged across the annular signal channel. The metal pads are spaced apart from the first electrodes and the second electrodes. The annular signal channel is provided without any one of the metal pads therein. Moreover, a projection space defined by orthogonally projecting the grounding layer along the thickness direction is overlapped with the first electrodes and the second electrodes.

In one of the possible or preferred embodiments, the grounding layer includes a connection segment and a plurality of shielding segments parallel to each other and each having an elongated shape. Each of the shielding segments has a connection end and a free end that is opposite to the connection end. The connection ends of the shielding segments are connected to the connection segment, and the free ends of the shielding segments are spaced apart from the connection segment.

In one of the possible or preferred embodiments, any two of the shielding segments adjacent to each other jointly define a plurality of layout areas therebetween, and a plurality of projection regions respectively defined by orthogonally projecting the metal pads onto the grounding layer along the thickness direction are each located in one of the layout areas.

In one of the possible or preferred embodiments, the first electrodes are substantially complementary in shape to the second electrodes.

Therefore, any one of the touch panel and the sensing module in the present disclosure is provided with the annular signal channel and the related components that are designed to be cooperated with the annular signal channel, so that the NFC antenna can be operated to transmit signals through the annular signal channel without affecting the operation of the first electrode layer and the second electrode layer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
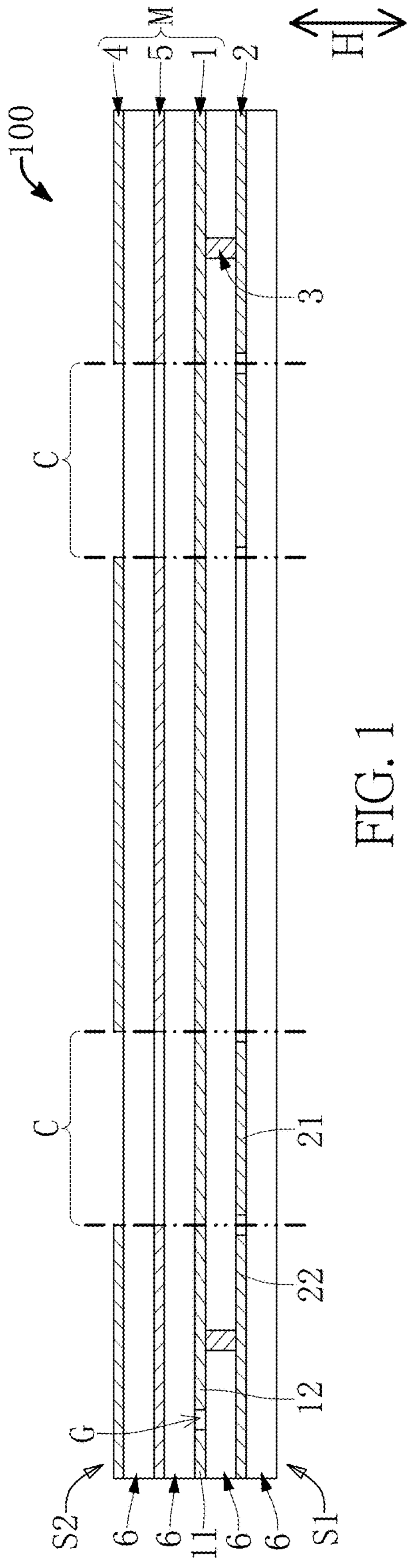
FIG. 1 is a schematic cross-sectional view of a touch panel according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 9, a first embodiment of the present disclosure is provided. As shown in FIG. 1, the present embodiment provides a touch panel 100 for allowing a signal to pass therethrough, and the touch panel 100 defines an annular signal channel C along a thickness direction H thereof. It should be noted that the annular signal channel C in the present embodiment has a rectangular ring-shape, and a covering space of the annular signal channel C penetrates the touch panel 100 along the thickness direction T, but the present disclosure is not limited thereto.

The touch panel 100 in the present embodiment includes a grounding layer 1, a circuit layer 2 located at one side of the grounding layer 1, a plurality of conductive pillars 3 connected in-between the grounding layer 1 and the circuit layer 2, a first electrode layer 4, a second electrode layer 5, and a plurality of insulating layers 6. The first electrode layer 4 and the second electrode layer 5 are located at another side of the grounding layer 1.

Specifically, any two of the grounding layer 1, the circuit layer 2, the first electrode layer 4, and the second electrode layer 5 adjacent to each other are separated from each other through one of the insulating layer 6, and each of the conductive pillars 3 is arranged along the thickness direction H and is embedded in one of the insulating layers 6 that is sandwiched between the grounding layer 1 and the circuit layer 2, but the present disclosure is not limited thereto. For example, in other embodiments of the present disclosure not shown in the drawings, any two of the grounding layer 1, the circuit layer 2, the first electrode layer 4, and the second electrode layer 5 adjacent to each other can be disposed on two of the insulating layers 6 that are fixed to at least one external component, and are provided without any one of the insulating layers 6 therebetween.

It should be noted that the grounding layer 1, the first electrode layer 4, and the second electrode layer 5 in the present embodiment can be jointly defined as a sensing module M that can also define the annular signal channel C along the thickness direction T. Moreover, the touch panel 100 in the present embodiment includes the above components, but the present disclosure is not limited thereto. For example, in other embodiments of the present disclosure not shown in the drawings, the sensing module M can be independently used (e.g., sold) or can be in cooperation with other components. The following description describes structure and connection relationship of each component of the touch panel 100 provided by the present embodiment.

Figure 2:
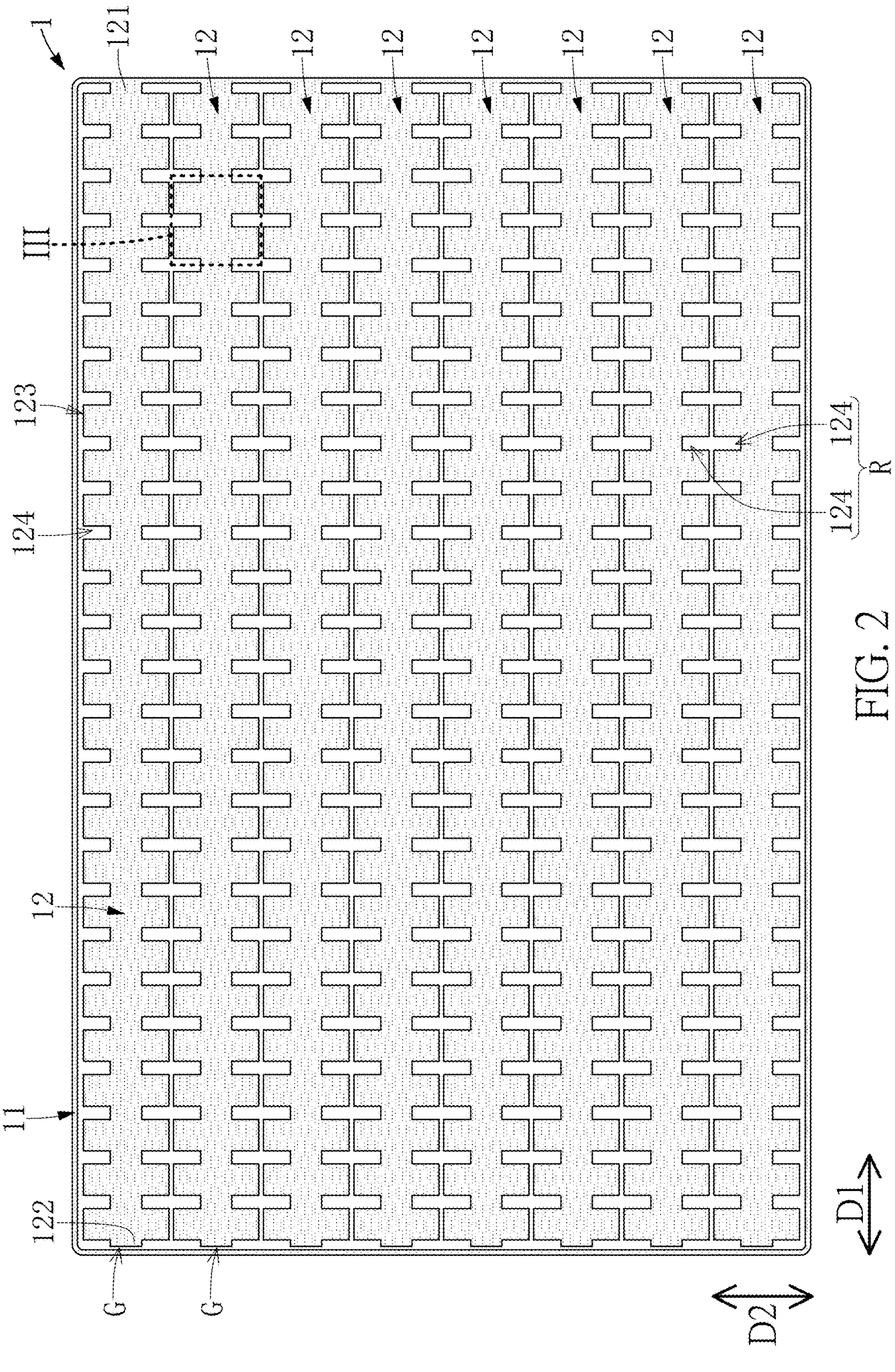
FIG. 2 is a schematic top view of a grounding layer according to the first embodiment of the present disclosure.
Figure 3:
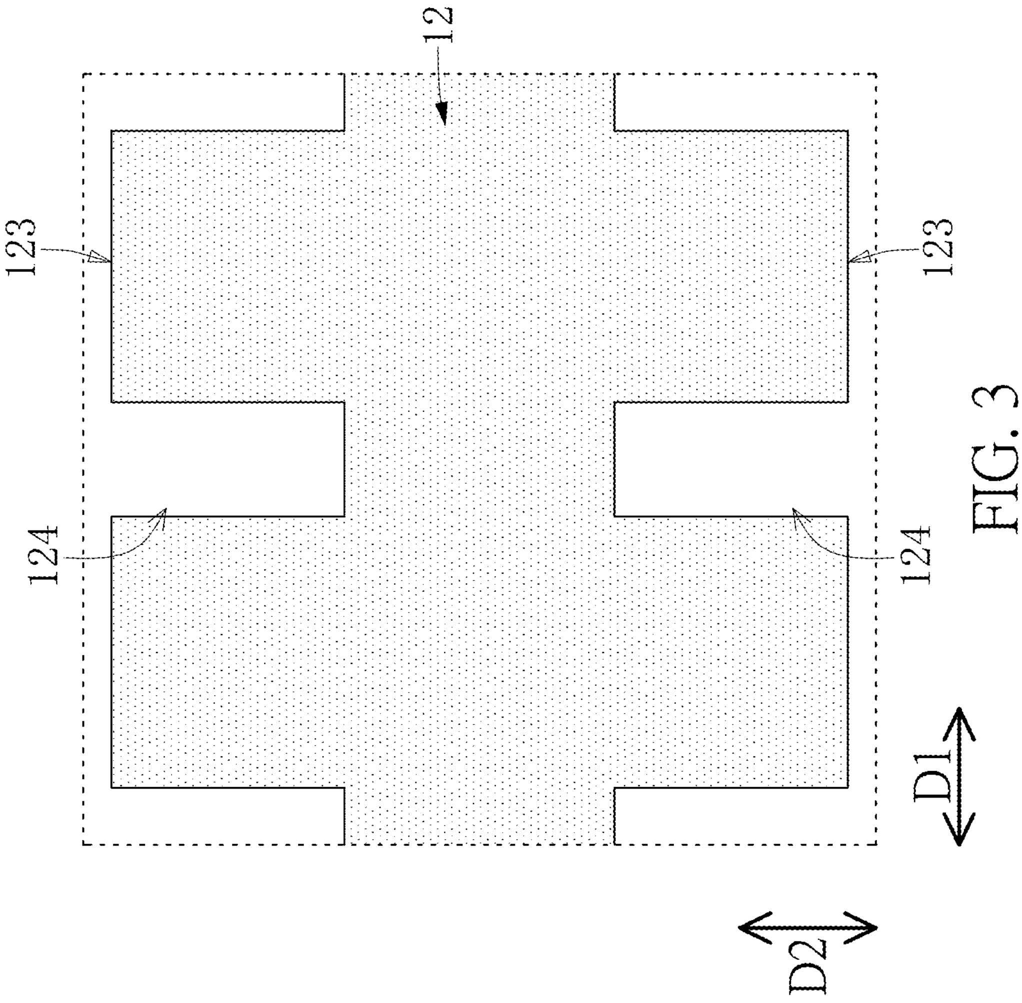
FIG. 3 is a schematic enlarged view of part III of FIG. 2.

As shown in FIG. 1 to FIG. 3, the grounding layer 1 defines a first side S1 and a second side S2 that is opposite to the first side S1 along the thickness direction T. The grounding layer 1 includes a connection segment 11 and a plurality of shielding segments 12 that are connected to the connection segment 11. In the present embodiment, the connection segment 11 has a ring shape, the shielding segments 12 are arranged in an area surrounded by the connection segment 11, the shielding segments 12 are spaced apart from each other and are parallel to each other, and each of the shielding segments 12 has an elongated shape being parallel to a first direction D1 that is perpendicular to the thickness direction T.

Specifically, each of the shielding segments 12 has a connection end 121 and a free end 122 that is opposite to the connection end 121. The connection ends 121 of the shielding segments 12 are connected to the connection segment 11, and the free end 122 of each of the shielding segments 12 is spaced apart from the connection segment 11 so as to form a gap G therebetween.

In the present embodiment, the shielding segments 12 are of a substantially same structure, and the connection ends 121 of the shielding segments 12 are connected to a same side edge of the connection segment 11 (e.g., a right side edge of the connection segment 11 shown in FIG. 2), so that the gaps G are arranged in one column along a second direction D2 that is perpendicular to the first direction D1 and the thickness direction T, but the present disclosure is not limited thereto. For example, in other embodiments of the present disclosure not shown in the drawings, the shielding segments 12 can be of different structures; or, the connection end 121 of each of the shielding segment 12 can be connected to one of two opposite side edges (e.g., one of a left side edge and the right side edge of the connection segment 11 shown in FIG. 2) of the connection segment 11 according to practical requirements.

Accordingly, through the structural cooperation of the connection segment 11 and the shielding segments 12 (e.g., the free ends 122 of the shielding segments 12 are spaced apart from the connection segment 11 through the gaps G), the grounding layer 1 in the present embodiment can be avoided forming a closed loop that would affect the operation of the touch panel 100. In other words, a region surrounded by the connection segment 11 and each of the shielding segment 12 is not closed, and the regions surrounded by the connection segment 11 and the shielding segment 12 are in spatial communication with each other through the gaps G.

In addition, any two of the shielding segments 12 adjacent to each other jointly define a plurality of layout areas R therebetween. Specifically, each of the shielding segments 12 has two long lateral edges 123 connected in-between the connection end 121 and the free end 122, and each of the two long lateral edges 123 has a plurality of notches 124 that are spaced apart from each other and that are arranged along the first direction D1. In two of the long lateral edges 123 of the grounding layer 1 respectively belonging to two of the shielding segments 12 and facing toward each other, each of the notches 124 of one of the two of the long lateral edges 123 corresponds in position to one of the notches 124 of another one of the two of the long lateral edges 123 along the second direction D2, so as to jointly define one of the layout areas R.

Figure 4:
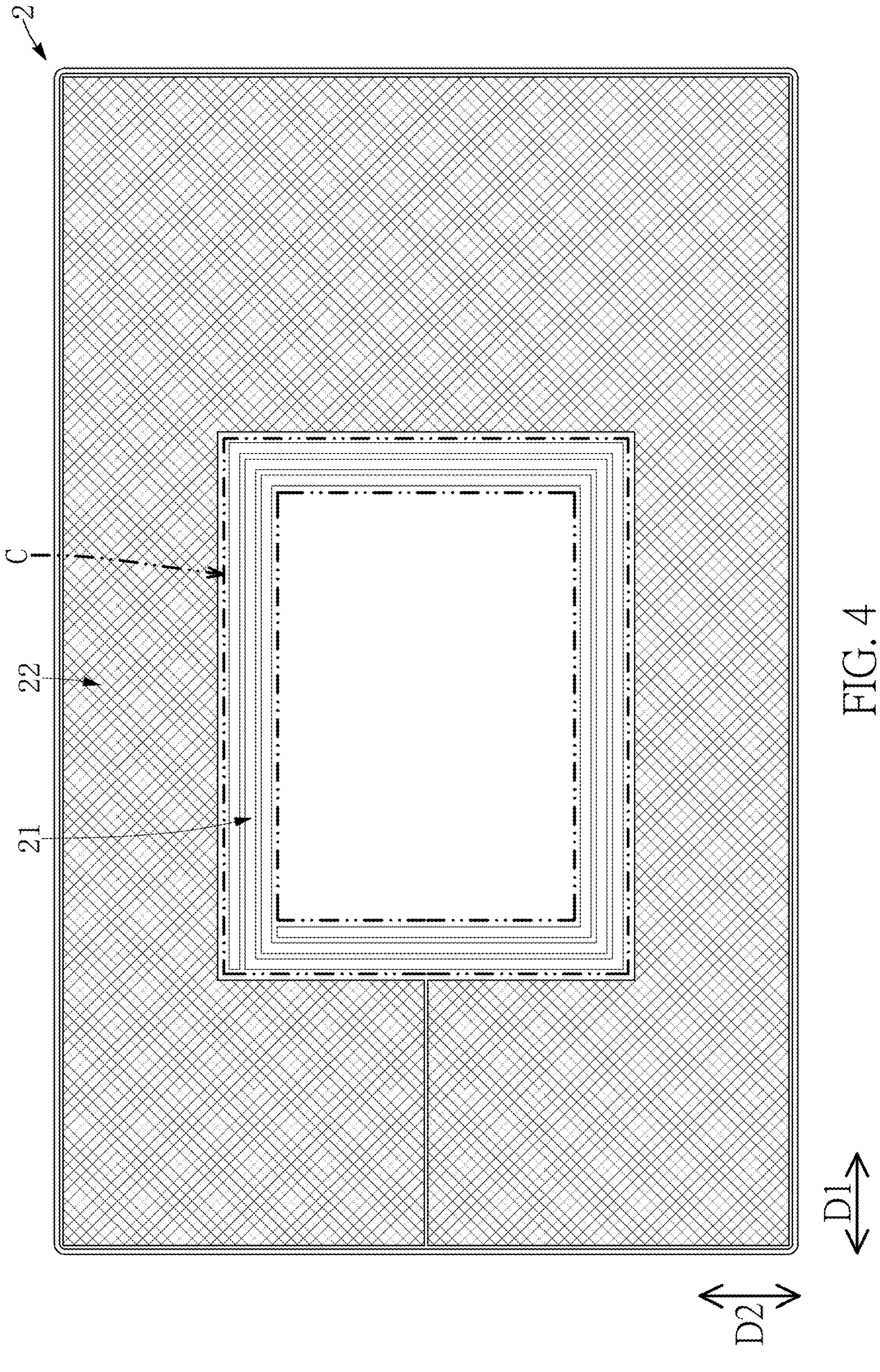
FIG. 4 is a schematic top view of a circuit layer according to the first embodiment of the present disclosure.

As shown in FIG. 1, FIG. 2, and FIG. 4, the circuit layer 2 is arranged at the first side S1 of the grounding layer 1 along the thickness direction T, and the circuit layer 2 in the present embodiment includes a near-field communication (NFC) antenna 21 arranged in the annular signal channel C and a shielding mesh 22 that surrounds an outer side of the annular signal channel C.

Specifically, two ends of each of the conductive pillars 3 are respectively connected to the grounding layer 1 and the shielding mesh 22 so as to be commonly grounded. The arrangement of the conductive pillars 3 can be adjusted or changed according to practical requirements, and the present embodiment is not limited thereto. Moreover, an outer contour of the shielding mesh 22 is preferably a non-closed loop (e.g., the outer contour of the shielding mesh 22 has a substantial C-shape), thereby preventing the shielding mesh 22 from forming a closed loop that would affect the operation of the touch panel 100.

As shown in FIG. 1, the first electrode layer 4 and the second electrode layer 5 are arranged at the second side S2 of the grounding layer 1 along the thickness direction T, and the second electrode layer 5 is arranged between the first electrode layer 4 and the grounding layer 1. In the present embodiment, the first electrode layer 4 is a sensing electrode layer (Rx), and the second electrode layer 5 is a driving electrode layer (Tx), but the present disclosure is not limited thereto. For example, in other embodiments of the present disclosure not shown in the drawings, the first electrode layer 4 can be a driving electrode layer (Tx), and the second electrode layer 5 can be a sensing electrode layer (Rx).

Figure 5:
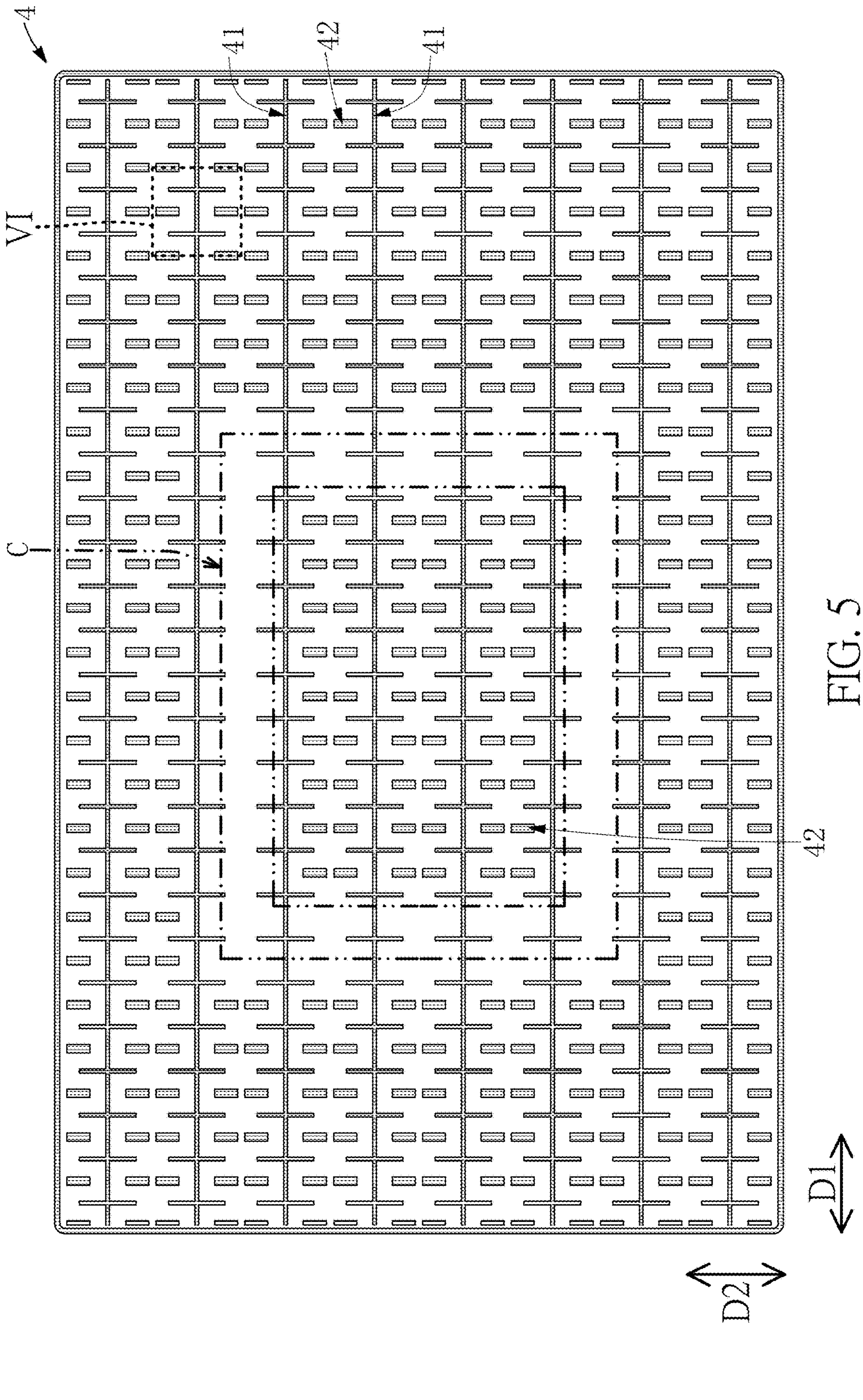
FIG. 5 is a schematic top view of a first electrode layer according to the first embodiment of the present disclosure.
Figure 6:
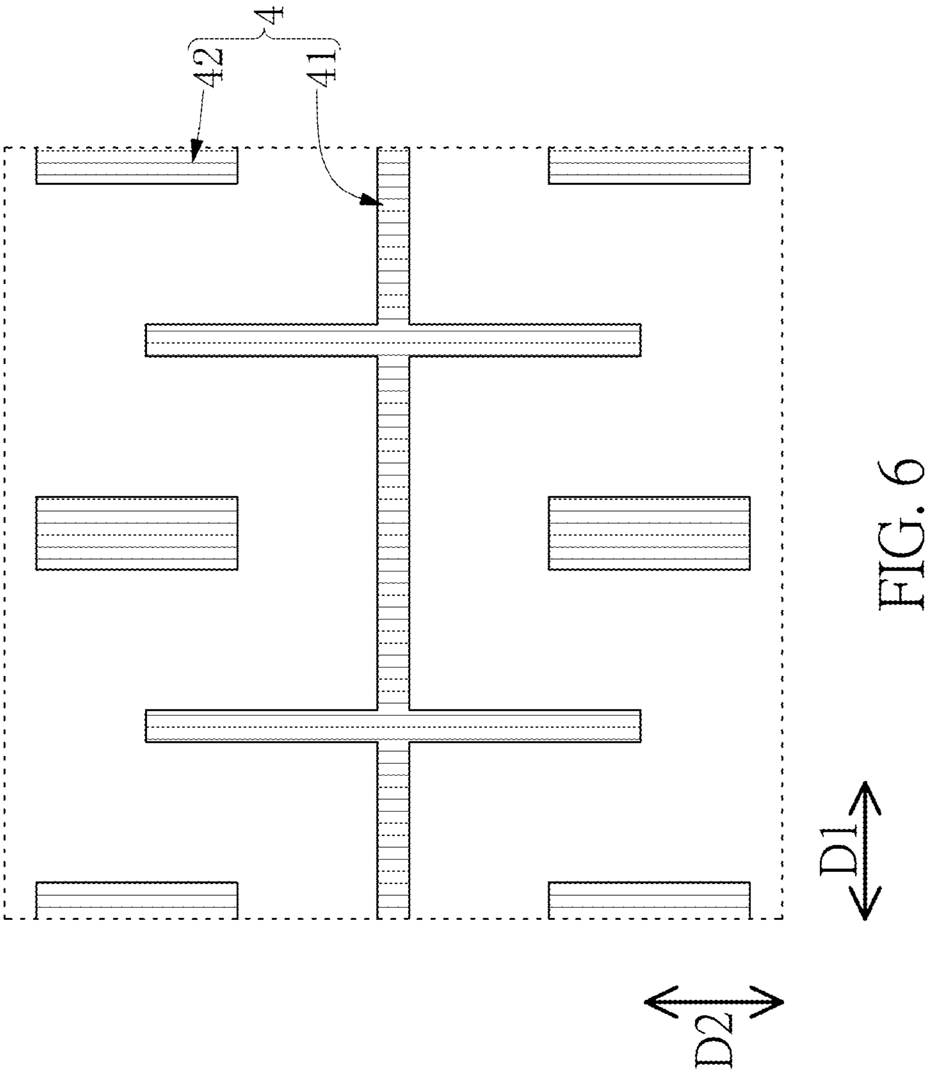
FIG. 6 is a schematic enlarged view of part VI of FIG. 5.

As shown in FIG. 1, FIG. 5, and FIG. 6, the first electrode layer 4 includes a plurality of first electrodes 41 and a plurality of first metal pads 42 that are spaced apart from the first electrodes 41. The first electrodes 41 are arranged in a plurality of rows that are spaced apart from each other and that are parallel to each other, and each of the rows in the present embodiment is parallel to the first direction D1 (i.e., the first electrodes 41 of each of the rows are connected along the first direction D1). Moreover, the first electrodes 41 of at least one of the rows are arranged across the annular signal channel C, and the annular signal channel C is provided without any one of the first metal pads 42 therein. In other words, the first metal pads 42 provided by the present embodiment are arranged at an inner side and an outer side of the annular signal channel C.

Figure 7:
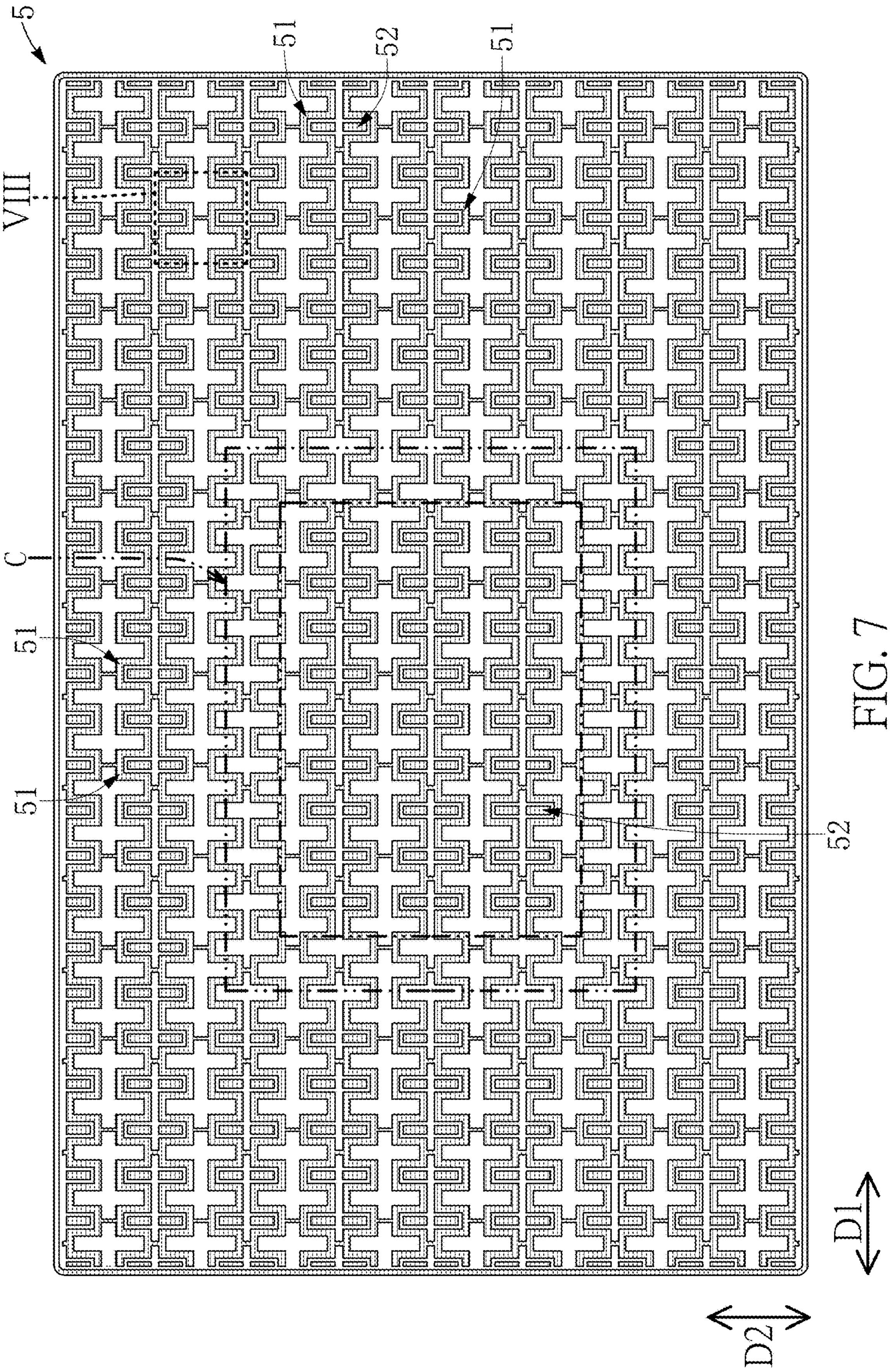
FIG. 7 is a schematic top view of a second electrode layer according to the first embodiment of the present disclosure.
Figure 8:
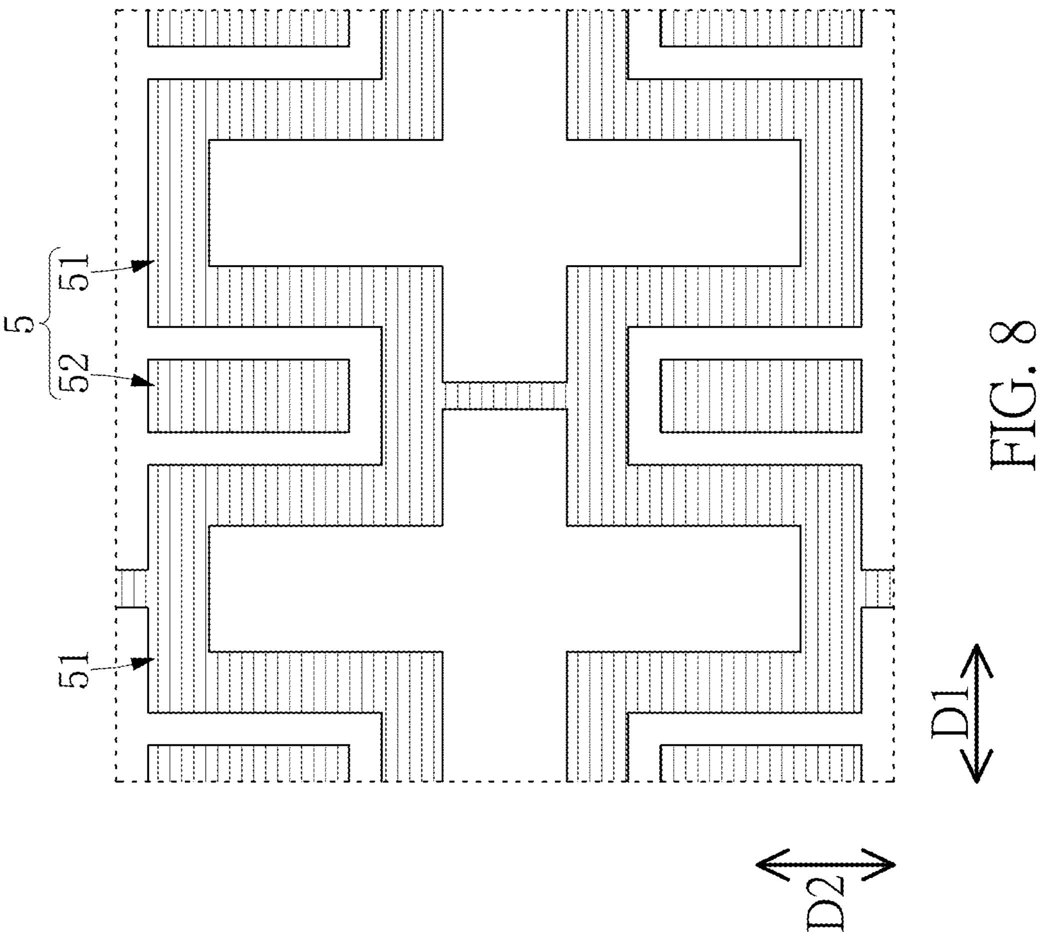
FIG. 8 is a schematic enlarged view of part VIII of FIG. 7.
Figure 9:
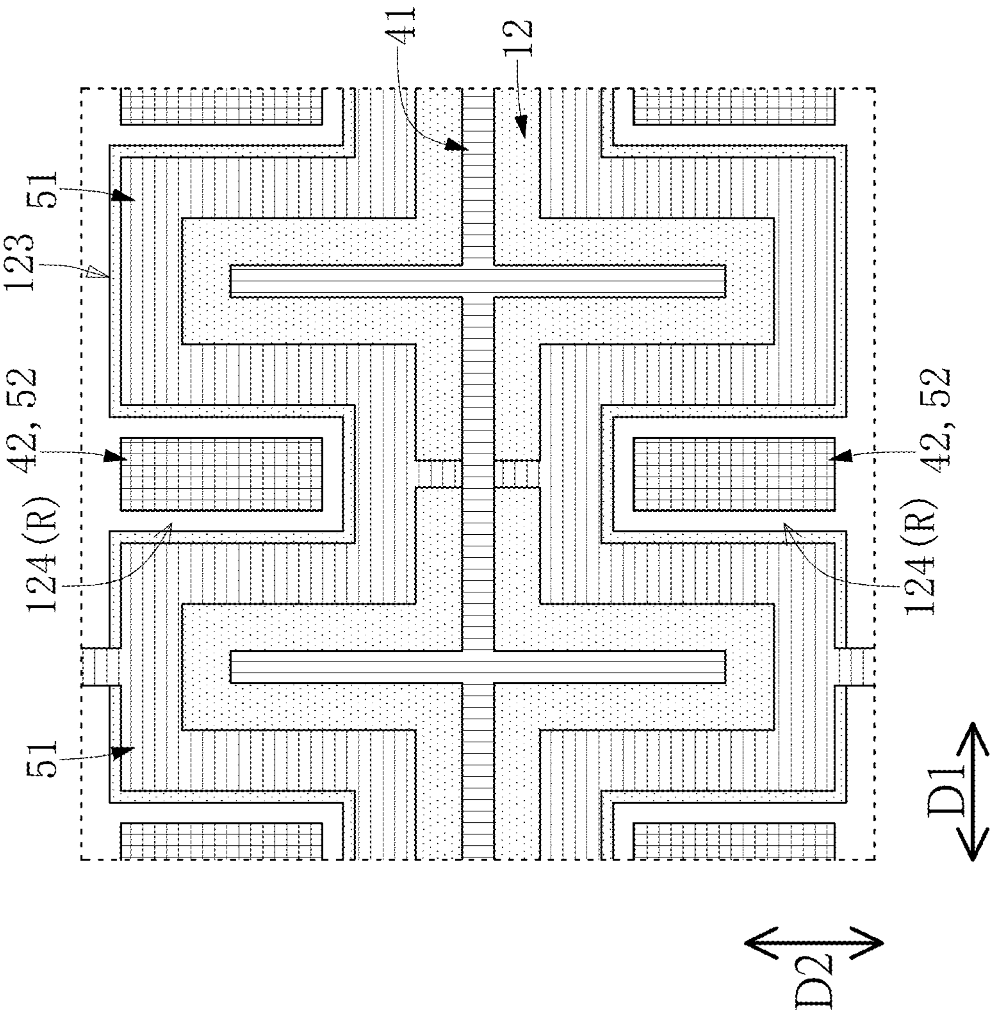
FIG. 9 is a schematic view showing FIG. 6, FIG. 7, and FIG. 3 stacked along a thickness direction.
Figure 10:
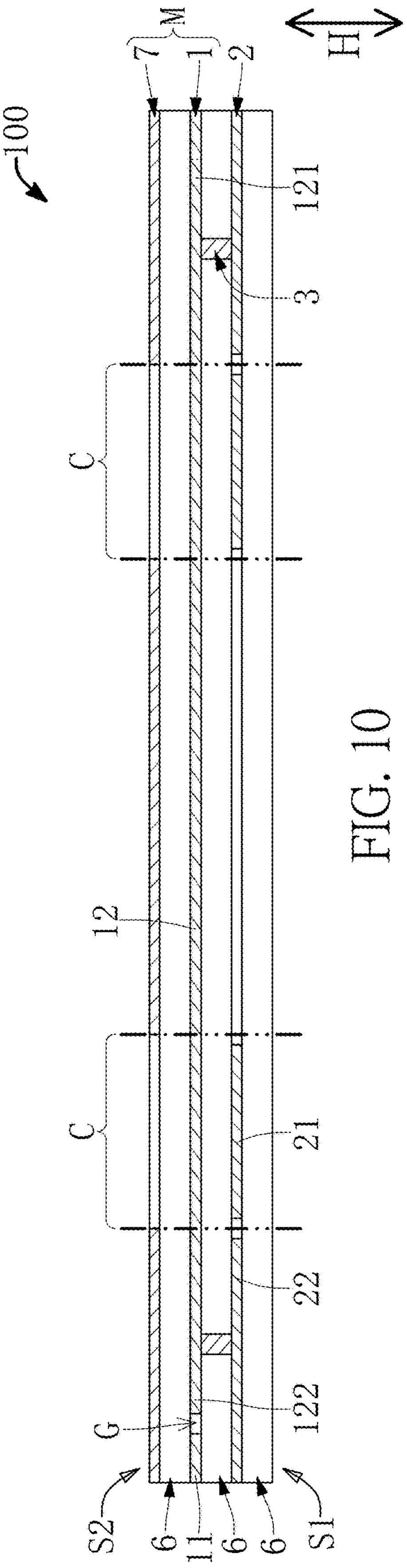
FIG. 10 is a schematic cross-sectional view of the touch panel according to a second embodiment of the present disclosure.
Figure 11:
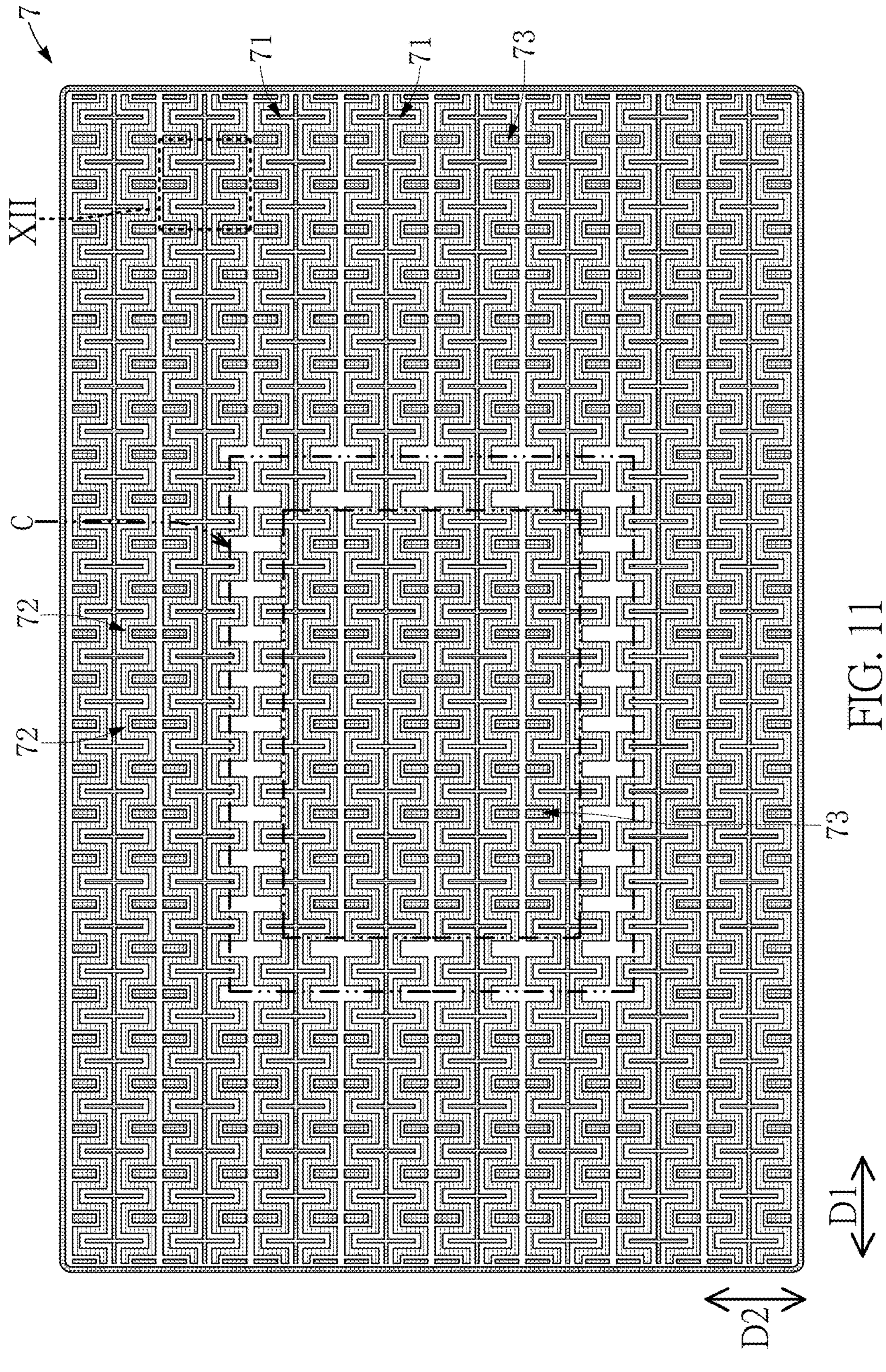
FIG. 11 is a schematic top view of an electrode layer according to the second embodiment of the present disclosure.
Figure 12:
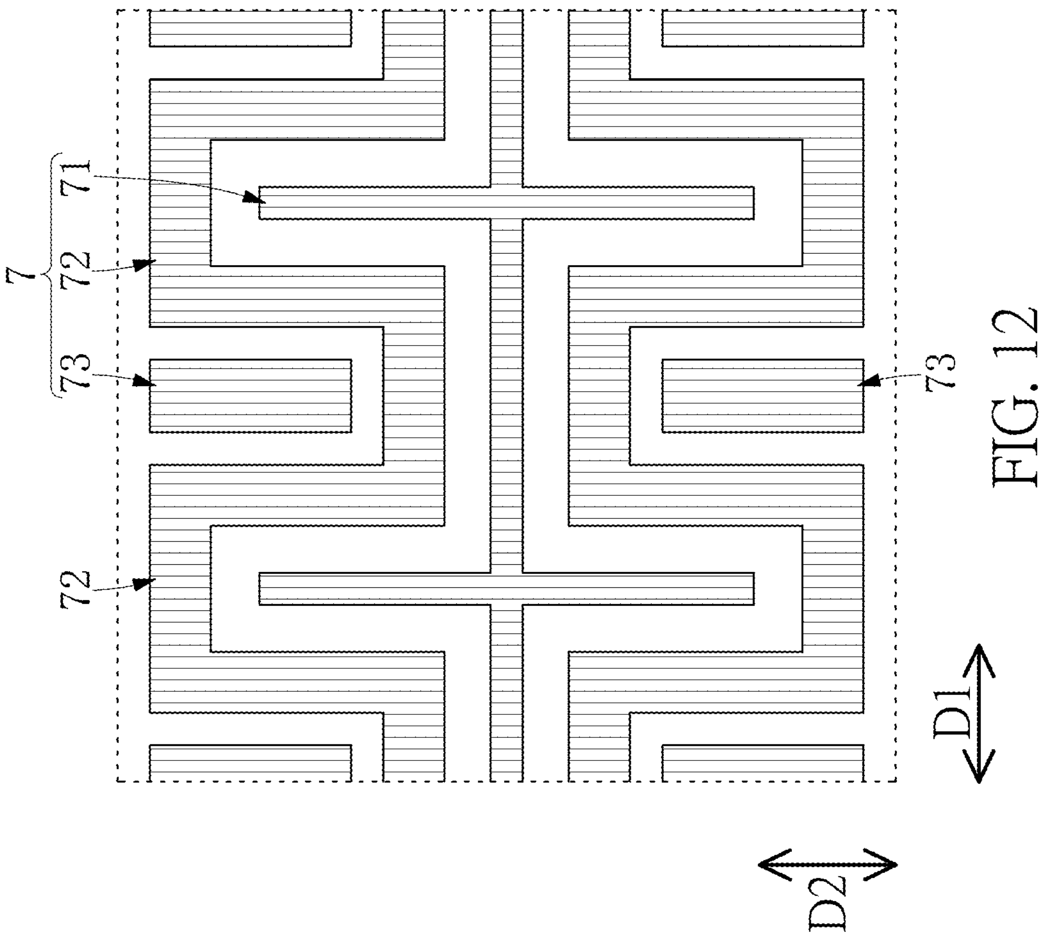
FIG. 12 is a schematic enlarged view of part XII of FIG. 11.
Figure 13:
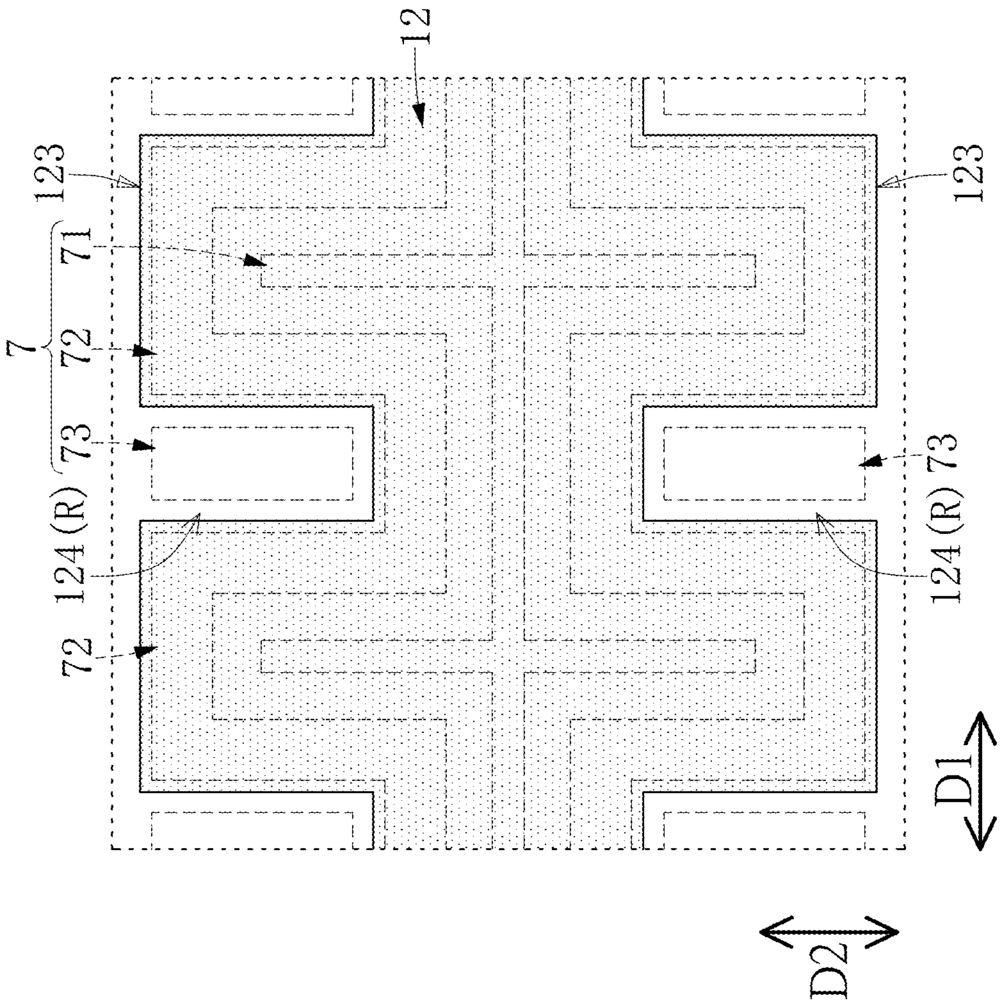
FIG. 13 is a schematic view showing a position relationship between the part XII of the electrode layer of FIG. 12 and a corresponding part of the grounding layer along the thickness direction.

As shown in FIG. 1, FIG. 7, and FIG. 8, the second electrode layer 5 includes a plurality of second electrodes 51 and a plurality of second metal pads 52 that are spaced apart from the second electrodes 51. The second electrodes 51 are arranged in a plurality of columns that are spaced apart from each other and that are parallel to each other, each of the columns in the present embodiment is parallel to the second direction D2, and the second electrodes 51 of each of the columns are electrically coupled to each other. Moreover, the second electrodes 51 of at least one of the columns are arranged across the annular signal channel C, and the annular signal channel C is provided without any one of the second metal pads 52 therein. In other words, the second metal pads 52 provided by the present embodiment are arranged at an inner side and an outer side of the annular signal channel C.

Specifically, as shown in FIG. 1 and FIG. 5 to FIG. 9, in order to enable the first electrode layer 4 and the second electrode layer 5 to jointly provide a preferred performance, a projection region defined by orthogonally projecting the first electrodes 41 onto the second electrode layer 5 along the thickness direction H is substantially complementary in shape to the second electrodes 51.

Furthermore, the first metal pads 42 and the second metal pads 52 in the present embodiment are provided as dummy pads and do not have any electrical function for the operation of the touch pad 100. However, a quantity of the first metal pads 42 and the second metal pads 52 can be adjusted according to design requirements for facilitating overall counterweight and balance of the touch pad 100. In other words, in other embodiments of the present disclosure not shown in the drawings, the first metal pads 42 and/or the second metal pads 52 can be omitted according to practical requirements.

In addition, a projection space defined by orthogonally projecting the grounding layer 1 along the thickness direction H is overlapped with the first electrodes 41 and the second electrodes 51, so that the grounding layer 1 can be used to prevent the first electrodes 41 and the second electrodes 51 from being affected by external signals that are transmitted from the first side S1 of the grounding layer 1.

Specifically, a plurality of first projection regions respectively defined by orthogonally projecting the first metal pads 42 onto the grounding layer 1 along the thickness direction H are each located in one of the layout areas R. Furthermore, a plurality of second projection regions respectively defined by orthogonally projecting the second metal pads 52 onto the grounding layer 1 along the thickness direction H are each located in one of the layout areas R.

In other words, the first projection regions in the present embodiment are (entirely) overlapped with the second projection regions, respectively, but the present disclosure is not limited thereto. For example, in other embodiments of the present disclosure not shown in the drawings, at least one of the first projection regions is (entirely) overlapped with one of the second projection regions.

In summary, any one of the touch panel 100 and the sensing module M in the present embodiment is provided with the annular signal channel C and the related components that are designed to be cooperated with the annular signal channel C, so that the NFC antenna 21 can be operated to transmit signals through the annular signal channel C without affecting the operation of the first electrode layer 4 and the second electrode layer 5.

Second Embodiment

Referring to FIG. 10 to FIG. 13, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

The present embodiment provides a touch panel 100, which includes a grounding layer 1, a circuit layer 2 located at one side of the grounding layer 1, a plurality of conductive pillars 3 connected in-between the grounding layer 1 and the circuit layer 2, an electrode layer 7 located at another side of the grounding layer 1, and a plurality of insulating layers 6. The grounding layer 1 and the electrode layer 7 can be jointly defined as a sensing module M, and the touch panel 100 or the sensing module M defines an annular signal channel C along a thickness direction H thereof.

Specifically, the touch panel 100 in the present embodiment combines the first electrode layer and the second electrode layer provided by the first embodiment to be formed as the electrode layer 7 disposed on one of the insulating layers 6, and the following description mainly describes structure and connection relationship of the electrode layer 7.

In addition, the other components of the touch panel 100 (e.g., the grounding layer 1, the circuit layer 2, the conductive pillars 3, and the insulating layers 6) in the present embodiment are substantially identical to those of the first embodiment and will be omitted in the following paragraphs for the sake of brevity. For example, in the present embodiment, the grounding layer 1 defines a first side S1 and a second side S2 that is opposite to the first side S1 along the thickness direction T, and the grounding layer 1 includes a connection segment 11 and a plurality of shielding segments 12 that are connected to the connection segment 11. The shielding segments 12 are spaced apart from each other and are parallel to each other, and any two of the shielding segments 12 adjacent to each other jointly define a plurality of layout areas R therebetween. Each of the shielding segments 12 has a connection end 121 and a free end 122 that is opposite to the connection end 121, the connection ends 121 of the shielding segments 12 are connected to the connection segment 11, and the free ends 122 of the shielding segments 12 are spaced apart from the connection segment 11.

The electrode layer 7 is arranged at the second side S2 of the grounding layer 1 along the thickness direction T. The electrode layer 7 includes a plurality of first electrodes 71, a plurality of second electrodes 72, and a plurality of metal pads 73 that are spaced apart from the first electrodes 71 and the second electrodes 72. In the present embodiment, the first electrodes 71 are sensing electrodes (Rx), and the second electrodes 72 are driving electrodes (Tx), but the present disclosure is not limited thereto. For example, in other embodiments of the present disclosure not shown in the drawings, the first electrodes 71 can be driving electrodes (Tx), and the second electrodes 72 can be sensing electrodes (Rx).

The first electrodes 71 are arranged in a plurality of rows that are spaced apart from each other and that are parallel to each other, and each of the rows in the present embodiment is parallel to a first direction D1 perpendicular to the thickness direction H (i.e., the first electrodes 71 of each of the rows are connected along the first direction D1). Moreover, the first electrodes 71 of at least one of the rows are arranged across the annular signal channel C.

The second electrodes 72 are arranged in a plurality of columns that are spaced apart from each other and that are parallel to each other, each of the columns in the present embodiment is parallel to a second direction D2 that is perpendicular to the thickness direction H and the first direction D1, and the first electrodes 71 are substantially complementary in shape to the second electrodes 72. Moreover, the second electrodes 72 of at least one of the columns are arranged across the annular signal channel C.

In addition, the annular signal channel C is provided without any one of the metal pads 73 therein. In other words, the metal pads 73 provided by the present embodiment are arranged at an inner side and an outer side of the annular signal channel C. Furthermore, the metal pads 73 in the present embodiment are provided as dummy pads and do not have any electrical function for the operation of the touch pad 100. However, a quantity of the metal pads 73 can be adjusted according to design requirements for facilitating overall counterweight and balance of the touch pad 100.

Moreover, a projection space defined by orthogonally projecting the grounding layer 1 along the thickness direction H is overlapped with the first electrodes 71 and the second electrodes 72, so that the grounding layer 1 can be used to prevent the first electrodes 71 and the second electrodes 72 from being affected by external signals that are transmitted from the first side S1 of the grounding layer 1. Furthermore, a plurality of projection regions respectively defined by orthogonally projecting the metal pads 73 onto the grounding layer along the thickness direction H are each located in one of the layout areas R.

Beneficial Effects of the Embodiments

In conclusion, any one of the touch panel and the sensing module in the present disclosure is provided with the annular signal channel and the related components that are designed to be cooperated with the annular signal channel, so that the NFC antenna can be operated to transmit signals through the annular signal channel without affecting the operation of the first electrode layer and the second electrode layer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A touchpad for allowing a signal to pass therethrough, the touchpad comprising:

a grounding layer defining a first side and a second side that is opposite to the first side along a thickness direction of the touchpad; wherein the grounding layer includes:

a connection segment; and a plurality of shielding segments each having an elongated shape, wherein each of the shielding segments has a connection end and a free end that is opposite to the connection end; and wherein the connection ends of the shielding segments are connected to the connection segment, and the free end of each of the shielding segments is spaced apart from the connection segment by a gap that is provided with no other shielding segments arranged therein; and a circuit layer spaced apart from the grounding layer along the thickness direction;

an electrode layer spaced apart from the grounding layer along the thickness direction and including:

a plurality of first electrodes arranged in a plurality of rows parallel to each other.

2. The touchpad according to claim 1, further comprising a plurality of second electrodes arranged in a plurality of columns parallel to each other, wherein the first electrodes of at least one of the rows are arranged across an annular signal channel that is defined by the touchpad, and wherein the second electrodes of at least one of the columns are arranged across the annular signal channel.

3. The touchpad according to claim 2, wherein each of the rows is parallel to a first direction perpendicular to the thickness direction, and each of the columns is parallel to a second direction perpendicular to the thickness direction, and wherein each of the shielding segments is parallel to the first direction.

4. The touchpad according to claim 3, wherein the first direction is perpendicular to the second direction, the first electrodes of each of the rows are connected along the first direction, and the second electrodes of each of the columns are electrically coupled to each other.

5. The touchpad according to claim 2, wherein the connection segment has a ring shape, the shielding segments are arranged in an area surrounded by the connection segment.

6. The touchpad according to claim 1, wherein regions surrounded by the connection segment and the shielding segments are in spatial communication with each other through the gaps.

7. The touchpad according to claim 1, wherein the elongated shape of each of the shielding segments is parallel to a first direction that is perpendicular to the thickness direction, and the gaps are arranged in one column along a second direction that is perpendicular to the first direction and the thickness direction.

8. The touchpad according to claim 1, wherein the circuit layer includes a shielding mesh surrounding an outer side of the annular signal channel, and an outer contour of the shielding mesh is a non-closed loop.

9. The touchpad according to claim 8, further comprising a plurality of conductive pillars each arranged along the thickness direction, wherein two ends of each of the conductive pillars are respectively connected to the grounding layer and the shielding mesh.

10. The touchpad according to claim 1, further comprising another electrode layer that is spaced apart from the grounding layer along the thickness direction and that includes a plurality of second electrodes arranged in a plurality of columns parallel to each other, wherein a projection region defined by orthogonally projecting the first electrodes onto the another electrode layer is substantially complementary in shape to the second electrodes.

11. A sensing module of a touchpad for allowing a signal to pass therethrough, the sensing module comprising:

a grounding layer defining a first side and a second side that is opposite to the first side along a thickness direction of the sensing module, wherein the grounding layer includes:

a connection segment; and a plurality of shielding segments each having an elongated shape, wherein each of the shielding segments has a connection end and a free end that is opposite to the connection end, and wherein the connection ends of the shielding segments are connected to the connection segment, and the free end of each of the shielding segments is spaced apart from the connection segment by a gap that is provided with no other shielding segments arranged therein;

an electrode layer spaced apart from the grounding layer along the thickness direction and including a plurality of first electrodes arranged in a plurality of rows parallel to each other.

12. The sensing module according to claim 11, further comprising a plurality of second electrodes arranged in a plurality of columns parallel to each other, wherein each of the rows is parallel to a first direction perpendicular to the thickness direction, and each of the columns is parallel to a second direction perpendicular to the thickness direction, and wherein the connection segment has a ring shape, the shielding segments are arranged in an area surrounded by the connection segment, and each of the shielding segments is parallel to the first direction.

13. The sensing module according to claim 11, wherein the electrode layer is defined as a first electrode layer that includes a plurality of first metal pads spaced apart from the first electrodes, wherein the first electrodes of at least one of the rows are arranged across an annular signal channel that is defined by the touchpad and that is provided without any one of the first metal pads therein, wherein the sensing module further includes a second electrode layer that includes a plurality of second metal pads spaced apart from the second electrodes, and wherein the second electrodes of at least one of the columns are arranged across the annular signal channel that is provided without any one of the second metal pads therein.

14. The sensing module according to claim 13, wherein any two of the shielding segments adjacent to each other jointly define a plurality of layout areas therebetween, and a plurality of first projection regions respectively defined by orthogonally projecting the first metal pads onto the grounding layer along the thickness direction are each located in one of the layout areas.

15. The sensing module according to claim 14, wherein a plurality of second projection regions respectively defined by orthogonally projecting the second metal pads onto the grounding layer along the thickness direction are each located in one of the layout areas.

16. The sensing module according to claim 15, wherein at least one of the first projection regions is overlapped with one of the second projection regions.

17. A sensing module of a touchpad for allowing a signal to pass therethrough, the sensing module comprising:

a grounding layer defining a first side and a second side that is opposite to the first side along a thickness direction of the sensing module; wherein the grounding layer includes:

a connection segment; and a plurality of shielding segments each having an elongated shape, wherein each of the shielding segments has a connection end and a free end that is opposite to the connection end; and wherein the connection ends of the shielding segments are connected to the connection segment, and the free end of each of the shielding segments is spaced apart from the connection segment by a gap that is provided with no other shielding segments arranged therein; and an electrode layer arranged at the second side of the grounding layer along the thickness direction.

18. The sensing module according to claim 17, wherein the electrode layer includes:

a plurality of first electrodes arranged in a plurality of rows parallel to each other, wherein the first electrodes of at least one of the rows are arranged across an annular signal channel defined by the sensing module; and a plurality of second electrodes arranged in a plurality of columns parallel to each other, wherein the second electrodes of at least one of the columns are arranged across the annular signal channel;

wherein a projection space defined by orthogonally projecting the grounding layer along the thickness direction is overlapped with the first electrodes and the second electrodes.

19. The sensing module according to claim 17, wherein regions surrounded by the connection segment and the shielding segments are in spatial communication with each other through the gaps.

20. The sensing module according to claim 17, wherein the elongated shape of each of the shielding segments is parallel to a first direction that is perpendicular to the thickness direction, and the gaps are arranged in one column along a second direction that is perpendicular to the first direction and the thickness direction.

* * * * *